United States Patent
Fornage

(10) Patent No.: US 7,694,906 B2
(45) Date of Patent: Apr. 13, 2010

(54) DEVICE FOR CONTINUOUSLY CONTROLLING CONDIMENTS GRINDING IN A MILL

(75) Inventor: Jean-Claude Fornage, Besancon (FR)

(73) Assignee: PSP Industries SAS, Quingey (FR)

( * ) Notice: Subject to any disclaimer, the term of this patent is extended or adjusted under 35 U.S.C. 154(b) by 699 days.

(21) Appl. No.: 10/565,457

(22) PCT Filed: Jul. 16, 2004

(86) PCT No.: PCT/FR2004/001896

§ 371 (c)(1),
(2), (4) Date: Jan. 20, 2006

(87) PCT Pub. No.: WO2005/009187

PCT Pub. Date: Feb. 3, 2005

(65) Prior Publication Data

US 2006/0192043 A1 Aug. 31, 2006

(30) Foreign Application Priority Data

Jul. 21, 2003 (FR) .................................. 03 08962
Mar. 3, 2004 (FR) .................................. 04 02299

(51) Int. Cl.
*A47J 17/00* (2006.01)
(52) U.S. Cl. .................................... 241/168; 241/169.1
(58) Field of Classification Search ................. 241/168, 241/169.1
See application file for complete search history.

(56) References Cited

U.S. PATENT DOCUMENTS

| 1,327,385 | A |   | 1/1920 | Hammer |           |
|-----------|---|---|--------|--------|-----------|
| 2,858,081 | A |   | 10/1958| Sinkinson |         |
| 3,124,313 | A | * | 3/1964 | Kraus  | 241/74    |
| 3,168,256 | A | * | 2/1965 | Bounds et al. | 241/169.1 |
| 4,343,437 | A | * | 8/1982 | Czelen | 241/169.1 |
| 4,685,627 | A |   | 8/1987 | Lee    |           |
| 4,993,584 | A |   | 2/1991 | Macario |          |
| 5,651,506 | A |   | 7/1997 | Hockey |           |
| 5,785,264 | A | * | 7/1998 | Yang   | 241/169.1 |
| 6,491,244 | B2|   | 12/2002| Pedersen |         |
| 6,616,075 | B1|   | 9/2003 | Millerd |          |
| 7,048,216 | B2| * | 5/2006 | Ng     | 241/169.1 |
| 2002/0038832 | A1 |  | 4/2002 | Chen  |           |
| 2002/0117566 | A1 | * | 8/2002 | Cheng | 241/169.1 |
| 2002/0117567 | A1 | * | 8/2002 | Lee et al. | 241/169.1 |
| 2002/0145065 | A1 |  | 10/2002 | McCowin |       |
| 2004/0124294 | A1 |  | 7/2004 | Ng    |           |
| 2004/0164193 | A1 | * | 8/2004 | Yang  | 241/169.1 |
| 2008/0315022 | A1 | * | 12/2008 | Wilson et al. | 241/169.1 |

FOREIGN PATENT DOCUMENTS

| BE | 469899 | 6/1947 |
| CH | 351726 | 1/1961 |

(Continued)

*Primary Examiner*—Bena Miller
(74) *Attorney, Agent, or Firm*—Gary M. Cohen

(57) ABSTRACT

A device for adjusting the grinding of a condiment in a mill includes a drive element having a thimble 6, a thimble support 4, a wheel 9 and a fixing ring 11 for attachment to the mill. Rotational movement of an adjustment ring 3 fitted with an adjustment stop 5 independent of the device results in translational movement of the thimble support 4.

18 Claims, 2 Drawing Sheets

FOREIGN PATENT DOCUMENTS

| | | |
|---|---|---|
| DE | 2922656 | 12/1980 |
| DE | 3632688 | 2/1983 |
| DE | 8531554 | 12/1985 |
| DE | 19514794 | 10/1996 |
| DE | 20000353 | 5/2000 |
| EP | 0281714 | 9/1988 |
| FR | 2159828 | 6/1973 |
| FR | 2852505 | 9/2004 |
| FR | 2857842 | 1/2005 |
| FR | 2865368 | 7/2005 |
| FR | 2873559 | 2/2006 |
| GB | 1429310 | 3/1976 |
| WO | WO 0028870 | 5/2000 |

\* cited by examiner

DEVICE FOR CONTINUOUSLY CONTROLLING CONDIMENTS GRINDING IN A MILL

BACKGROUND OF THE INVENTION

The present invention relates to a continuously adjustable device for grinding condiments such as salt, pepper or any other spice, in a mill.

Devices of this type are known in the art, and provide for adjustment of the grinding action of the mill by modifying the position of part of the grinding mechanism of the condiment mill, allowing step changes in the degree of fineness of the grinding.

In this type of device, the operator comes in contact with the condiment being ground when the grinding action of the mill is adjusted. This leads to a risk of the product becoming contaminated. In addition, it is not possible to adapt this type of adjustment device to electrically operated condiment mills because the adjustment device has to be positioned where the condiment exits the mill.

It should also be emphasized that the grinding adjustment device is dependent on the body of the condiment mill. As a result, if the adjustment device deteriorates, the entire mill has to be changed.

It is an object of the present invention to solve these various drawbacks by providing an adjustment device for a condiment mill that offers continuous adjustment of the grinding of the condiment, that avoids contact between the user and the product to be ground, and that enables the fineness of the grinding to be adjusted.

SUMMARY OF THE INVENTION

In accordance with the present invention, a device is provided for adjusting the grinding of a condiment in a mill. To this end, the drive element of the mill includes a thimble, a thimble support, a wheel and a fixing ring for attachment to the mill. Rotational movement of an adjustment ring fitted with an adjustment stop independent of the device results in a translational movement of the thimble support.

A clearer understanding of the present invention will be gained from the description given below, with reference to the following drawings.

DETAILED DESCRIPTION OF PREFERRED EMBODIMENTS

Figure 1:
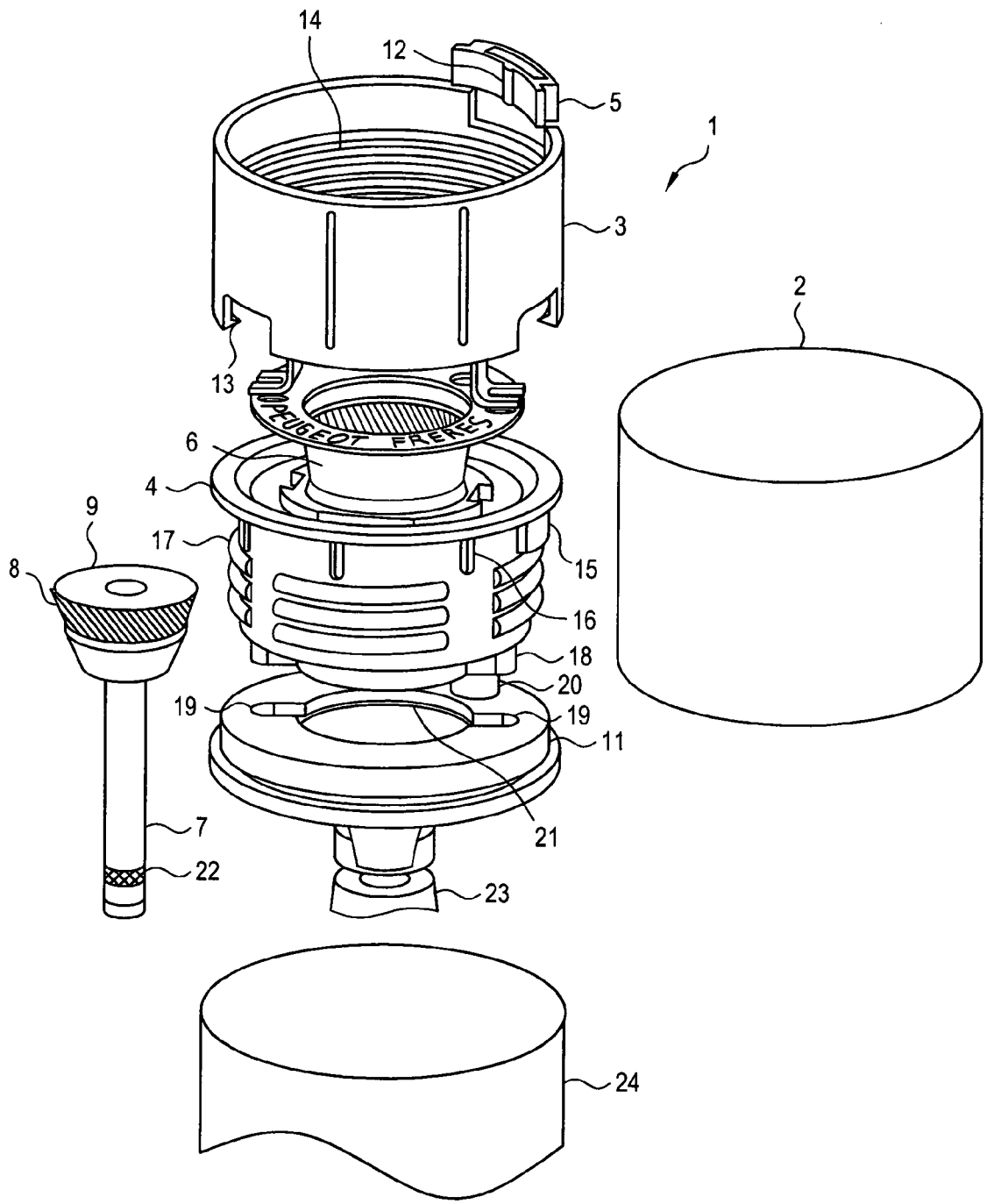
FIG. 1 shows an exploded view of the grinding adjustment device before being fitted onto the drive pin of the condiment mill.
Figure 2:
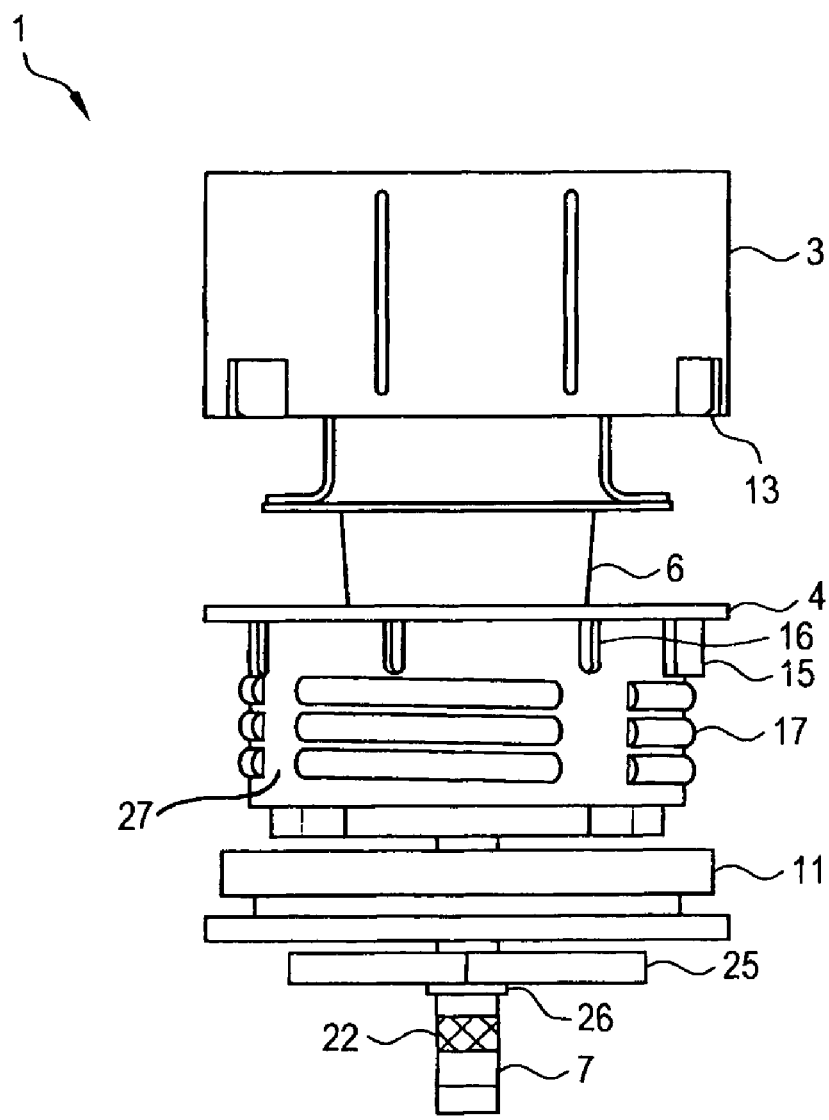
FIG. 2 is an elevational view of the assembly shown in FIG. 1.

FIGS. 1 and 2 show a device 1 which includes an adjustment ring 3 having an adjustment stop 5, a thimble 6, a thimble support 4, an attachment ring 11, and a drive pin 7 surrounded by a wheel 9.

The top part of the device 1 includes the adjustment ring 3, which is operated by turning the ring. The top of the adjustment ring 3 is provided with an adjustment stop 5. The adjustment stop 5 includes an indexing bar 12, which can be used to set the grinding to certain, predefined sizes established by a series of notches 16 associated with the thimble support 4, as will be described more fully below. However, the grinder can also be adjusted continuously, that is, all the way around the adjustment ring 3, and not only in the notches 16 provided for such purposes.

The bottom of the adjustment ring 3 has fixing clips 13 for attaching the adjustment ring 3 to the attachment ring 11. The clips 13 will preferably take the form of plastic teeth.

A screw thread 14 is provided on the inside of the adjustment ring 3, for engaging the thimble support 4. To this end, a screw thread 17 is provided on the outside of the thimble support 4, for engagement with the screw thread 14 of the adjustment ring 3. The screw thread 17 is interrupted at regular intervals (shown, for example, at 27 in FIG. 2) to avoid obstruction of the device 1 in the event that some of the condiment is received between the adjustment ring 3 and the thimble support 4.

The bar 12 of the adjustment stop 5 indexes the adjustment ring 3 with respect to the thimble support 4, in this way enabling the degree of fineness of the grind to be adjusted. The thimble 6 is fixed to the thimble support 4, as will be described more fully below, defining specific relative positions in rotation.

The thimble support 4 is provided with a reinforcement 15 which makes contact with the adjustment stop 5 of the adjustment ring 3 at the forward and reverse limits. The reinforcement 15 is level with the notches 16, which receive the indexing bar 12 and which are located on the outer top face of the thimble support 4. The illustrated thimble support 4 includes five notches 16 for receiving the indexing bar 12, offering five indexed adjustment positions. Intermediate positions are still possible, providing a great variety of grind sizes.

Screw columns 18 are provided on the underside of the thimble support 4 which enable the thimble 6 to be held in the attachment ring 11, without rotation, creating a sliding connection. The attachment ring 11 fits underneath the thimble support 4, and is provided with two housings 19 for receiving fixing columns 20 of the thimble support 4. The housings 19 also prevent the thimble support 4 from rotating. The inside top part of the attachment ring 11 is provided with a protective collar 21 to prevent the condiment from being thrown into the mechanism.

The drive pin 7 of the condiment mill is then placed in the assembly formed by the attachment ring 11, the thimble 6, the thimble support 4 and the adjustment ring 3. The top end of the drive pin 7 includes a holding spring 8 and the wheel 9. The wheel 9 is clamped in the thimble support 4 and the thimble 6. The spring 8 can be replaced by a plastic spacer for "salt" movements, to avoid any risk of corrosion. The opposing end of the drive pin 7 has a knurling 22 which enables the drive pin 7 to be held in the assembly ring 23. The assembly ring 23 sits beneath the attachment ring 11, and is force-fitted onto the drive pin 7, where it grips the knurling 22.

The outer body 24 of the condiment mill is mounted on the attachment ring 11, forming a reservoir for the condiment. An annulus 2 can further be provided which has a purely decorative function, and can be ornamented in various ways.

The adjustment ring 3 screws onto the thimble support 4. The spring clips 13 snap onto the attachment ring 11, fixing the two structures together. The thimble 6 fits between the adjustment ring 3 and the thimble support 4.

Turning the adjustment ring 3 results in vertical sliding movement of the thimble support 4. Vertical movement of the thimble support 4 will be limited both by the adjustment stop 5 and by the reinforcement 15. The thimble support 4 can have a maximum amplitude of 3 mm, thus varying the fineness of the grind.

By contrast, the vertical position of the wheel 9 is fixed. The wheel 9 is held in the vertical direction by a thrust stop 25, combined with a circlip 26 positioned beneath the thrust stop 25. The thrust stop 25 can be fixed either to the attachment ring 11 or directly to the body 24 of the condiment mill.

Because the thimble support 4 cannot turn, the thimble support 4 cannot be pulled around by the rotary movement of the wheel 9. This ensures that the adjustment setting is not accidentally altered.

The mill adjustment device of the present invention modifies the position between the wheel 9 and the thimble 6 by moving the thimble, and not by moving the wheel, as was the usual practice. Such an adjustment device offers continuous grinding. What is more, such an adjustment device is independent of the operation of the rest of the mill. As a result, the mill adjustment device of the present invention is readily adaptable to different types of mills, whether manual or electric, using an adapter. In addition, this type of grinding adjustment device can be adapted both to pepper mills and to instruments of different kinds, owing to its geometry and compact design. Moreover, the adjustment system of the present invention reduces manufacturing costs because it is comprised of few parts.

The adjustment ring can be decorated to suit different models of the condiment mill. The condiment mill can be made of wood or stainless steel, for example.

Although the present invention has been described with reference to particular embodiments, the present invention further encompasses all technical equivalents of the means described.

The invention claimed is:

1. A device for adjusting grinding of a condiment in a mill, wherein the device comprises:
   a grinder including a thimble coupled with a thimble support, and a wheel coupled with the thimble for grinding the condiment responsive to relative rotation between the wheel and the thimble;
   an adjustment ring coupled with the grinder and including an adjustment stop, wherein rotational movement of the adjustment ring causes vertical movement of the thimble support within the mill, wherein the wheel is vertically fixed in position within the mill, and wherein rotational movement of the adjustment ring causes vertical movement of the thimble relative to the vertically fixed wheel.

2. The device of claim 1 wherein the position of the adjustment stop is variable.

3. The device of claim 1 wherein the adjustment stop includes an indexing bar for continuous positioning of the adjustment ring.

4. The device of claim 3 wherein the thimble support includes a plurality of notches for receiving the indexing bar of the adjustment stop.

5. The device of claim 1 wherein the adjustment ring includes an internal screw thread.

6. The device of claim 5 wherein the thimble support includes an external screw thread for cooperating with the internal screw thread of the adjustment ring.

7. The device of claim 6 wherein the external screw thread is interrupted at regular intervals.

8. The device of claim 1 wherein complete rotational movement of the adjustment ring causes the thimble support to move vertically by 3 mm.

9. The device of claim 1 wherein the thimble support includes screw columns on an underside of the thimble support.

10. The device of claim 9 wherein the thimble support is connected to a fixing ring for attachment to the mill.

11. The device of claim 10 wherein inner portions of the fixing ring include a protective collar.

12. The device of claim 11 wherein the protective collar is located on upper portions of the fixing ring.

13. The device of claim 10 wherein the adjustment ring includes clips for engaging the fixing ring.

14. The device of claim 13 wherein the clips are plastic teeth.

15. The device of claim 1 which further includes a thrust stop for holding the wheel in the vertically fixed position.

16. The device of claim 15 wherein the thrust stop is held in position by a circlip coupled with a spring.

17. The device of claim 1 which further includes a reinforcement located on an outer face of the thimble support, wherein the reinforcement cooperates with the adjustment stop to limit movement of the adjustment ring.

18. The device of claim 17 wherein the reinforcement is located on upper portions of the outer face of the thimble support.

* * * * *